(12) United States Patent
Avganim

(10) Patent No.: US 11,641,076 B2
(45) Date of Patent: May 2, 2023

(54) DEVICE BASED LOCK VIA ELECTRICAL SOCKET

(71) Applicant: Noble Security, Inc., Pflugerville, TX (US)

(72) Inventor: Meir Avganim, Gealya (IL)

(73) Assignee: NOBLE SECURITY, INC., Pflugerville, TX (US)

( * ) Notice: Subject to any disclaimer, the term of this patent is extended or adjusted under 35 U.S.C. 154(b) by 0 days.

(21) Appl. No.: 17/584,214

(22) Filed: Jan. 25, 2022

(65) Prior Publication Data

US 2022/0149564 A1 May 12, 2022

Related U.S. Application Data

(63) Continuation of application No. 17/160,280, filed on Jan. 27, 2021, now Pat. No. 11,303,057.
(Continued)

(51) Int. Cl.
*H01R 13/627* (2006.01)
*H01R 13/434* (2006.01)
(Continued)

(52) U.S. Cl.
CPC ....... *H01R 13/434* (2013.01); *H01R 13/4364* (2013.01); *H01R 13/665* (2013.01); *H01R 2201/16* (2013.01)

(58) Field of Classification Search
CPC .......... H01R 13/6275; H01R 13/65802; H01R 13/4536
See application file for complete search history.

(56) References Cited

U.S. PATENT DOCUMENTS 3,844,013 A * 10/1974 Hall, Jr. ................. H01R 43/26
D8/58
5,480,318 A * 1/1996 Garrison ................ H01R 24/30
439/346
(Continued)

FOREIGN PATENT DOCUMENTS

WO WO 2011/161804 A1 12/2011

OTHER PUBLICATIONS

International Preliminary Report on Patentability and Written Opinion dated Aug. 11, 2022 in corresponding PCT International Application No. PCT/US2021/015688.

*Primary Examiner* — Phuong Chi Thi Nguyen
(74) *Attorney, Agent, or Firm* — Ostrolenk Faber LLP

(57) ABSTRACT

An electronically lockable, electrical plug configured to communicate power and data signals to mobile electronic devices (MED) includes a male electrical plug body insertable into a female electrical socket of the MED and plurality of electrical contacts defined in the male electrical plug for communicating the power and data signals to and from the MED, via corresponding electrical contacts associated with an MED electrical socket. The MED electrical socket is shaped and sized to physically receive and support therein said male electrical plug body. Plug locking elements are formed in the male plug body are so formed as to be lockable to or with corresponding, complementary socket locking elements of the MED, so that upon insertion of the male plug body into the MED socket the electrical plug is locked with the MED An associated, electronically operable locking mechanism is operable to mechanically disengage the plug locking elements from the socket locking elements to thereby enable the electrical plug to be released from the MED and an electrical cable is coupled to the male plug body for electrically conducting the signals.

17 Claims, 14 Drawing Sheets

Related U.S. Application Data

(60) Provisional application No. 62/979,863, filed on Feb. 21, 2020, provisional application No. 62/967,456, filed on Jan. 29, 2020.

(51) Int. Cl.
*H01R 13/66* (2006.01)
*H01R 13/436* (2006.01)

(56) References Cited

U.S. PATENT DOCUMENTS

| | | | |
|---|---|---|---|
| 5,782,646 A * | 7/1998 | Broadfield | H02J 7/0045 439/346 |
| 5,947,771 A * | 9/1999 | Bethurum | H01R 24/58 439/946 |
| 9,425,565 B1 * | 8/2016 | Chien | H01R 12/707 |
| 9,502,837 B2 * | 11/2016 | Kao | H01R 13/6581 |
| 9,734,358 B2 | 8/2017 | Soffer et al. | |
| 9,966,700 B2 | 5/2018 | Gee | |
| 10,398,045 B2 | 8/2019 | Avganim | |
| 2008/0041125 A1 | 2/2008 | Poppe | |
| 2012/0295462 A1 | 11/2012 | Villarreal | |

\* cited by examiner

DEVICE BASED LOCK VIA ELECTRICAL SOCKET

CROSS-REFERENCE TO RELATED APPLICATIONS

The present non-provisional patent application is a continuation of U.S. patent application Ser. No. 17/160,280, filed Jan. 27, 2021, by Meir Avganim, and entitled "DEVICE BASED LOCK VIA ELECTRICAL SOCKET," which claims the benefit of and priority to U.S. Provisional Patent Application Nos. 62/979,863, filed Feb. 21, 2020, by Meir Avganim, and entitled "DEVICE BASED LOCK VIA ELECTRICAL SOCKET" and 62/967,456, filed Jan. 29, 2020, by Meir Avganim, and entitled "DEVICE BASED LOCK FOR USB-C PLUG." The entire contents of each of the patent applications listed above are incorporated herein by reference.

BACKGROUND OF THE INVENTION

The present invention relates to methods and devices for enhancing computer physical and information security by physically blocking unused USB ports with self-locking devices, or by providing a USB port with a locking device with internal circuitry that secures a user peripheral device attached to the computer, by using USB ports and the like to lock therein an anti-theft security cable and/or a combination of both physical and information security. More specifically, the present invention introduces a lock mechanism, preferably software (APP) controlled, which is provided within the computing or communication device and which is able to grasp onto and lock the plug of a USB cable to the device, e.g., a mobile telephone, a tablet and the like and/or lock the head end of locking cable to the computing device, the other end of which cable being tethered to an immovable object such as a chair, a table or the like.

The APP software controlling the lock mechanism may be adapted to continuously communicate with a management software application that provides real-time monitoring and warnings when any USB port or cable associated therewith is being removed or tampered with.

Generally, universal serial bus (USB) ports provide a serial bus standard for connecting devices to computers. Most modern computers include at least one, and usually a plurality of USB ports. USB ports are used to connect peripherals such as mice, keyboards, scanners, digital cameras, printers, external storage, etc.

Anyone with access to a computer's USB port can plug a portable flash drive or other mass storage device into the port and attempt to download information from the computer. Unauthorized, downloading information from the computer is a security problem. Intentional or unintentional downloading of malicious code from plugged USB devices is another critical security problem. U.S. Patent Application Publication No. 2008/0041125; USB PORT LOCKING AND BLOCKING DEVICE, to Carl Poppe, discloses a mechanical lock for USB ports. Another such lock mechanism is described in U.S. Pat. No. 9,734,358, the contents of which are incorporated by reference herein.

USB Type-C ports are now found on all manners of devices from simple external hard devices to smartphone charging cables. USB-C is an industry-standard connector for transmitting both data and power on a single cable. The USB-C connector was developed by the USB Implementers Forum (USB-IF), the group of companies that has developed, certified, and shepherded the USB standard over the years. The USB-IF counts more than 700 companies in its membership, among them Apple, Dell, HP, Intel, Microsoft, and Samsung. This broad acceptance by the big device makers is important, because it's part of why USB-C has been so readily accepted by PC manufacturers.

SUMMARY OF THE INVENTION

Accordingly, it is an object of the present invention to provide a simple to use, device-based lock that grasps and locks a USB cable plug to the USB port.

It is a further object of the present invention to provide a USB port lock of the type referred to above that is software operated.

It is yet another object of the invention to provide a locking scheme for USB ports which does not require any meaningful altering of existing USB cables.

The foregoing and other objects of the invention are realized in accordance with preferred lock embodiments of the invention that provide a lock located inside the computing device, which lock is configured to grasp onto and hold the plug end of the USB-C cable firmly attached to the USB-C port.

In preferred embodiments, the present invention comprises an electronically lockable, electrical plug configured to communicate power and data signals to mobile electronic devices (MED), the electrical plug comprising: a male electrical plug body insertable into a female electrical socket of the MED; a plurality of electrical contacts defined in the male electrical plug for communicating the power and data signals to and from the MED, via corresponding electrical contacts associated with an MED electrical socket, said MED electrical socket being shaped and sized to physically receive and support therein said male electrical plug body; at least one plug locking element formed in the male plug body, so formed as to be lockable to or with at least one corresponding, complementary socket locking element of the MED, so that upon insertion of the male plug body into the MED socket the electrical plug is locked with the MED; an associated, electronically operable locking mechanism that is operable to mechanically disengage the plug locking element from the socket locking element to thereby enable the electrical plug to be released from the MED; and an electrical cable coupled to the male plug body for electrically conducting the signals.

Preferably, a metallic cable is coupled to the male plug body, the cable having a distal free end that enables the distal free end to be tethered to an immovable object and thereby prevent theft of the MED The metallic cable is integrated with the electrical cable. The male plug body is shaped and configured to function as a USB-C plug. The male plug body has a general rectangular shape and wherein said at least one plug locking element comprises length-wise juxtaposed, first and second recesses that are formed in the male plug body and sized and shaped to receive said at least one socket locking element.

Preferably, the male plug is provided in combination with said MED, and said MED including and electrical system for sliding said at least one socket locking element out of said recesses. The electrical system may include a solenoid for mechanically moving the at least one socket locking element and a wireless interface is provided that is configured to allow a user to communicate with the electrical system to instruct operation of the mechanical disengaging of the electrical plug from the MED.

Alternatively, an external controller is coupled to the electrical plug and configured to produce control signals to the locking mechanism to release the electrical plug from the MED, wherein the external controller includes and provides a plurality of USB sockets that are electrically configured to provide communications with the MED, via the MED electrical socket. In an embodiment, the at least one socket locking element comprises a pair of hinge-mounted socket locking elements configured to move into and out of said recesses.

Preferably, the system includes a software driven APP module that is stored and running within said MED and a corresponding APP module stored and running within a user mobile device to communicate software instructions to said locking mechanism. Alternatively, there is included a software driven APP module that is stored and running within said external controller and a corresponding APP module stored and running within a user mobile device to communicate software instructions to said locking mechanism.

Other features and advantages of the present invention will become apparent from the following description of the invention which refers to the accompanying drawings.

DETAILED DESCRIPTION OF PREFERRED EMBODIMENTS OF THE INVENTION

Figure 1:
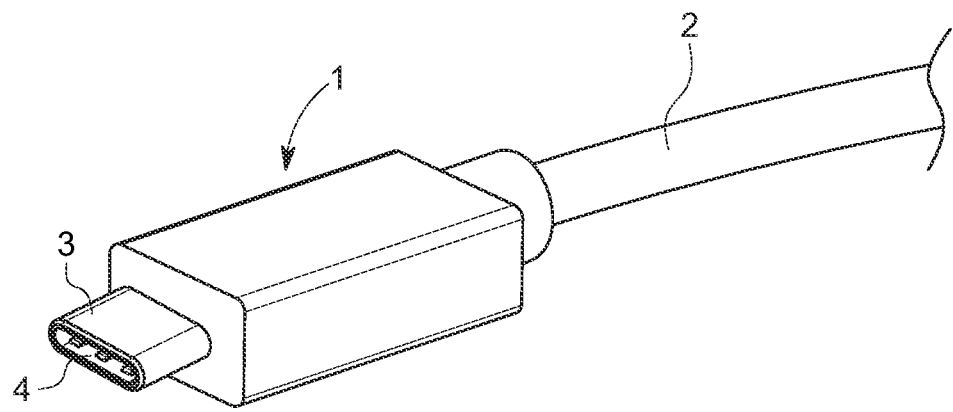
FIG. 1 perspectively illustrates a conventional USB-C cable.
Figure 2:
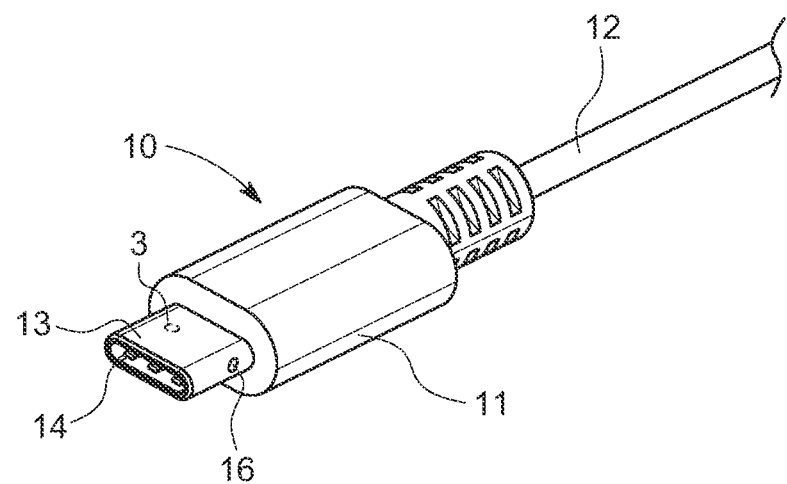
FIG. 2 perspectively illustrates an otherwise conventional USB-C cable that has been provided with a pair of dents or through-going holes on a wall portion thereof for receiving a pair of locking elements therein.
Figure 3:
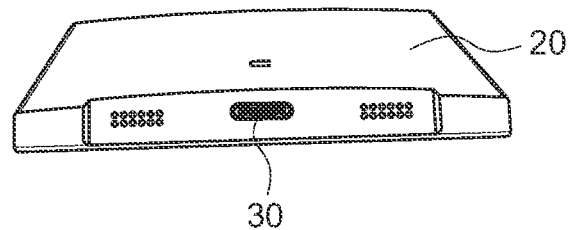
FIG. 3 shows a prior art computing device with a USB-C plug receptacle.

With reference to the drawings, initially illustrated is a conventional USB-C electrical cable 1 in which the cable 2 is connected to a plug body that supports the insertable plug 3, including internal pins 4. The USB-C cable 1 of FIG. 1 is reconfigured as a lockable plug 10 in FIG. 2. The lockable plug 10 has a cable 12 attached to the plug body 11 with the insertable plug 13, pins 14 and a pair of lock opening 16 located on opposed narrow side walls of the conventional USB-C plug. In FIG. 3 is illustrated a prior art computing device 20, which can be a tablet, a mobile device or even a large computer 20, which is outfitted with a conventional USB-C socket 30.

Figure 4:
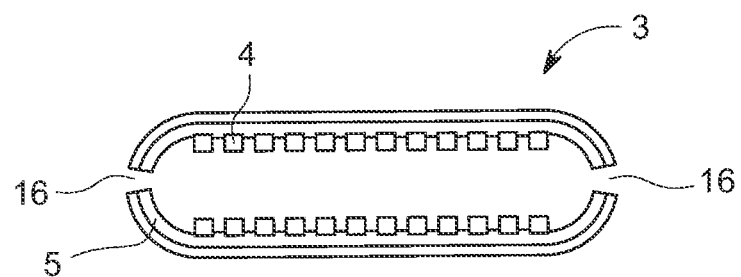
FIG. 4 diagrammatically illustrates a USB-C body shape and electrical contact locations.
Figure 5:
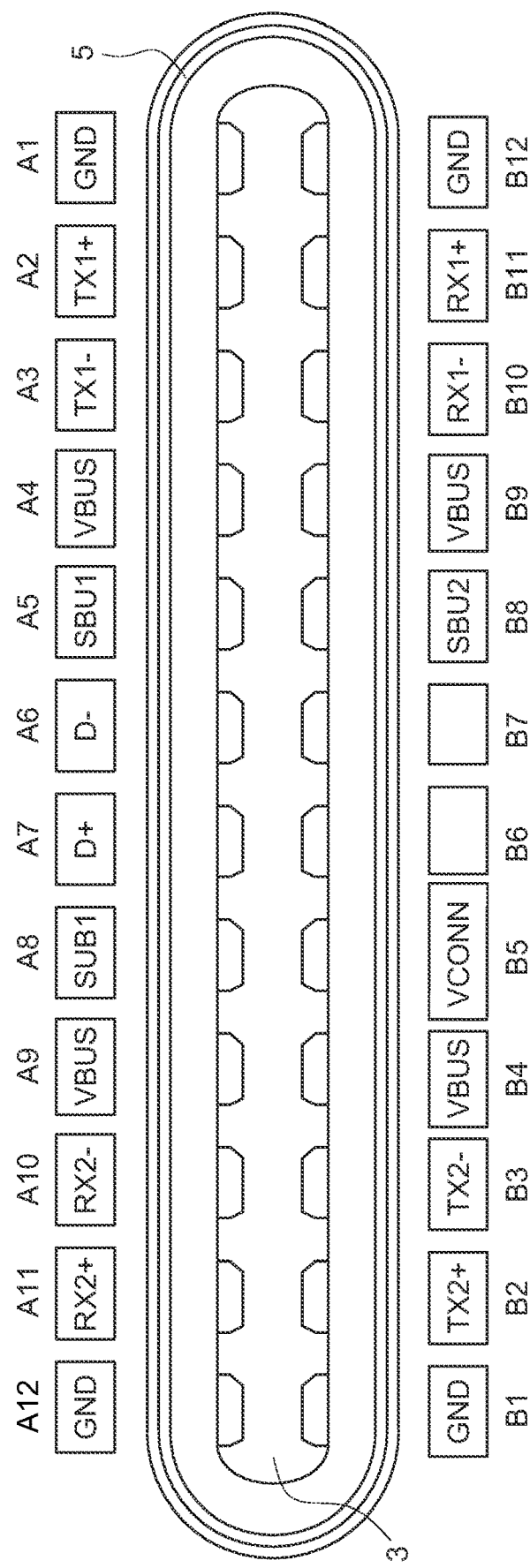
FIG. 5 illustrates and identifies diagrammatically the functions of the various electrical pins in a USB-C plug.

FIG. 4 illustrates diagrammatically the internal configuration of a conventional insertable USB-C plug 3 showing its contact pins 4 located along the two long walls of the generally rectangular but ends rounded side walls plug, the shape of which is defined by a circumscribing wall 5 that has a predetermined thickness on the order of less than a millimeter in width. FIG. 5 shows the surrounding wall 5 and the overall plug 3 identifying the functionalities associated with the different electrical pins 4.

Figure 6:
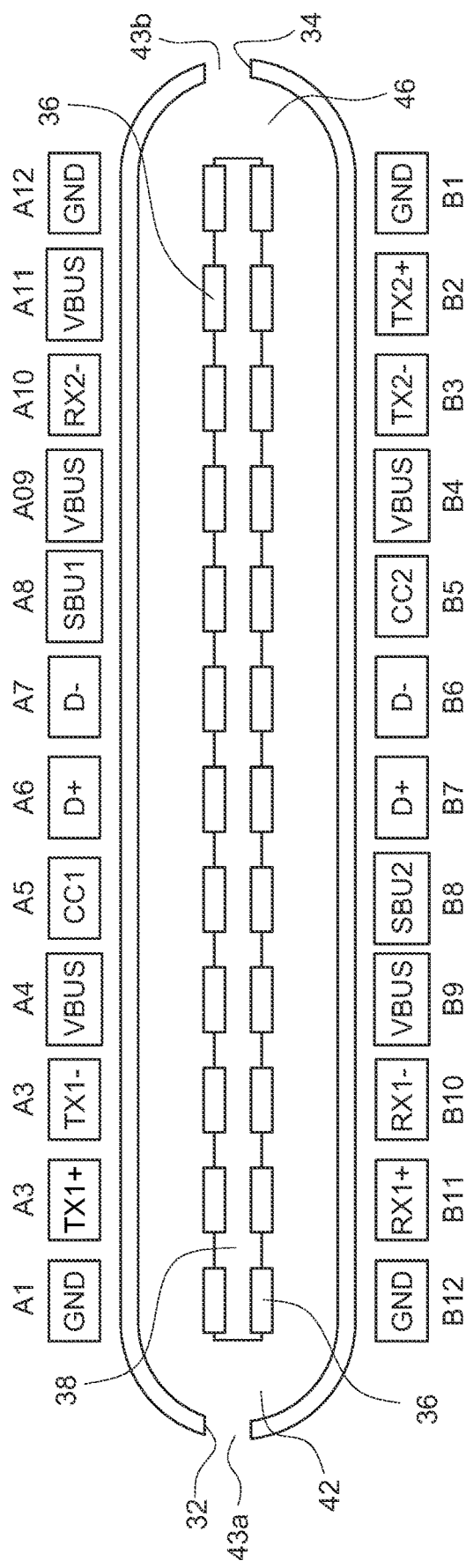
FIG. 6 diagrammatically illustrates the general configuration and the electrical conductors (pins) of a socket that receives a USB-C electrical plug.
Figure 7:
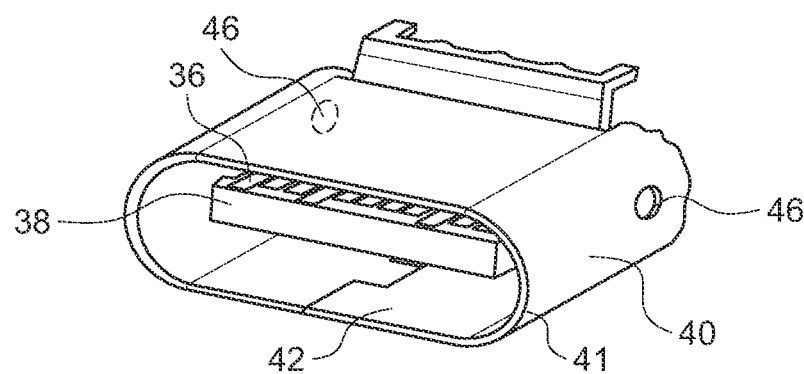
FIG. 7 is a perspective diagram of the general mechanical configuration of a USB-C receptacle or socket.

Turning to the socket side of a USB-C portal, FIG. 7 perspectively shows that the USB-C socket 40 is defined by an outer circumscribing wall 41 which defines an interior shaped to precisely and fittingly receive the plug 3 therein, the interior space 42 accommodating therein a flat plate 38 which has formed electrical pins 36 on the top surface thereof (as shown) and a similar pin arrangement on a bottom surface thereof (not shown). In FIG. 6 are shown the circuit board plate 38 with the pins 36 both along the top and the bottom surfaces thereof, the plate 38 being spaced from the circumscribing wall 32 which has a predetermined thickness. The interior space 42 leaves enough of a gap between the side walls 43a and 43b to accommodate the thickness of the plug wall 5 to be received therein. Special note should be made of the pair of locking holes 46 provided on the outer wall 41 of the USB-C port on the one hand and the corresponding similar locking holes 16 provided on the plug of the USB-C cable. Furthermore, when the plug 3 is inserted into the interior 42 of the USB-C socket, the locking holes 16 and 46 are strategically located so they register with each other.

Figure 8:
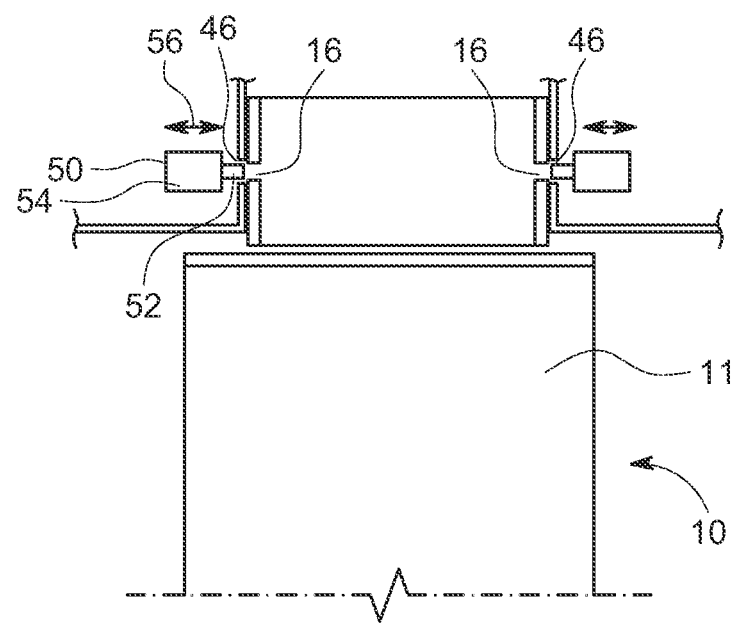
FIG. 8 diagrammatically illustrates a locking mechanism for a USB-C port, in accordance with a first embodiment of the invention.

With this modification to the plug of the conventional USB-C cable, one objective of the invention can be realized as illustrated diagrammatically in FIG. 8 wherein a locking mechanism 50 (shown on the left side of the socket 40) includes a locking pin 52 that is partially located within the lock opening 46 and is also connected to a moving body 54 that is controlled to move back and forth in the directions of the arrow 56 based on software commands issued by the APP software application that controls its movement. Although reference numerals are not provided at the right side in FIG. 8, the operation is essentially the same.

Figure 9:
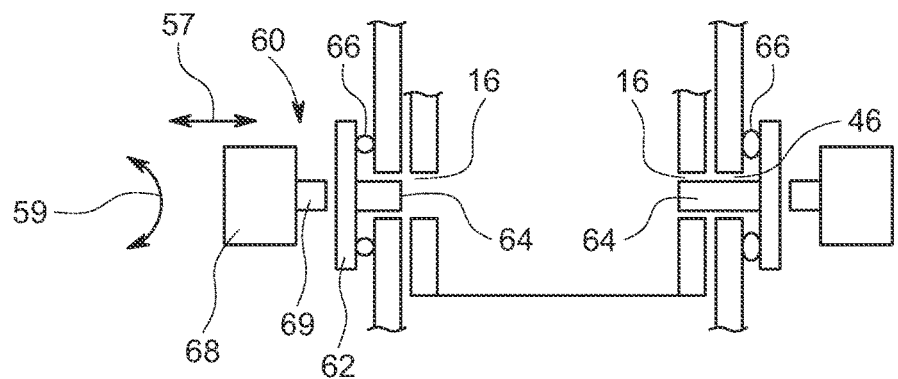
FIG. 9 illustrates a second locking mechanism in accordance with another embodiment of the invention.

With reference to FIG. 9, in another preferred embodiment, the lock mechanism 60 has a movable pin 64 that is connected to a body 62 that is normally biased by resilient material or a spring 66 to be located outside of the locking hole 16. In that state, the USB-C plug head can be freely inserted in and out of the socket (the interior 42) as in conventional devices. However, the moving mechanism 68 can receive instructions from the locking software that causes it to operate on the body 62 pushing it inwardly as shown on the right side of FIG. 9 and thereby having the pin 64 occupy both locking holes 16 and 46, preventing the USB-C plug from being separated from the USB-C socket. That is, when the moving mechanism 68 receives its instruction to move inwardly, the spring or the resilient material 66 becomes deformed as shown in FIG. 9 and keeps the locking pin 64 in a locked position.

As indicated by arrow 57 in FIG. 9, the moving mechanism 68 can be of a type that is solenoid-operated and moves right and left in the figure. Alternatively, the moving mechanism 68 might have its pushing shaft 69 located in a threaded socket or have a shape that is scanned so that when it is rotated a quarter of a turn, as indicated by the arrow 59, it advances or retracts the position of the pin 64, changing its position from either a locked to an unlocked position, or vice versa. When using a rotational mechanism, one obtains the advantage that even if power is removed from the device, the locking location/position will not change, regardless of whether the power is maintained or is removed from the lock device.

Figure 10:
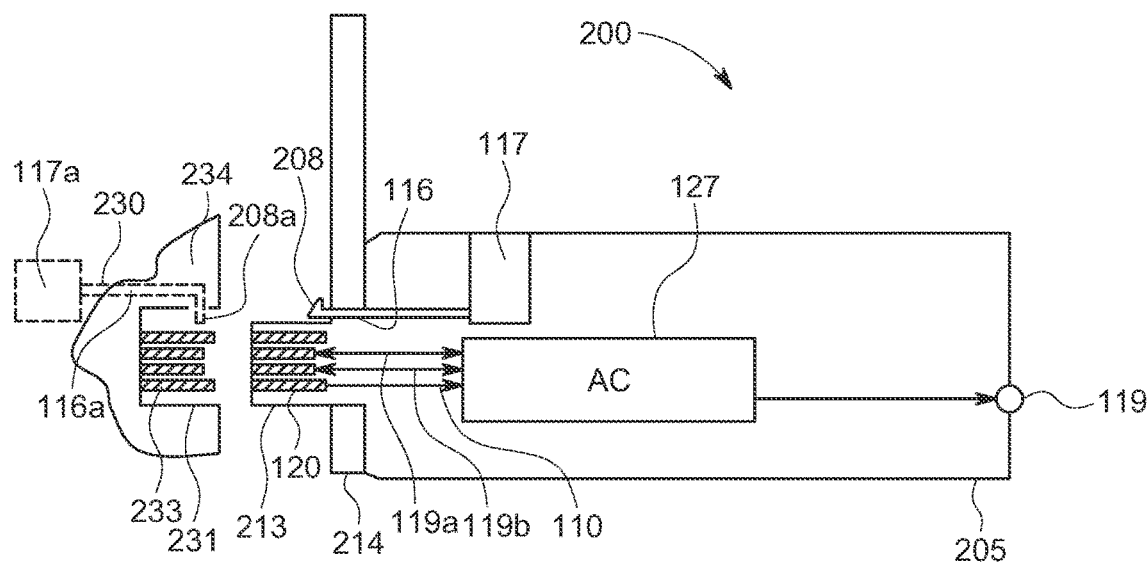
FIG. 10 illustrates diagrammatically a third concept that can use a known lock configuration that is adapted for the present invention.

Yet a third embodiment of a locking mechanism can be adapted for the present invention from one of the figures of the aforementioned incorporated by reference patent, as shown in FIG. 10. In the illustrated lock mechanism, a locking mechanism 117 has a locking pin 208 at the end of the arm that can engage a locking hole 234 in a USB-C socket 230. That is, when the electrical contacts 233, 120 are moved to the left (in the figure) and locked inside the socket 231, that is when the plug 213 is fully inserted, the tip of the locking element 208 will fall into the locking hole 234.

The present invention in one embodiment reconfigures the prior art lock described above, to avoid providing the tiny USB-C plug with the illustrated locking mechanism. However, for the present invention, the reader is requested to transpose the location of the locking mechanism 117, place it within, i.e., inside, the computing device and allow the tip 208 to be located outside both the socket and the plug and its tip penetrating both locking holes 46 and 16 as illustrated in FIG. 9. Indeed, the reversal of the location of the locking mechanism is shown in dashed lines in FIG. 10, it also being noted that the reversely located mechanism 117a with its movable operating arm 116a and locking pin 208a should be and can be duplicated on both sides of the receptacle 231, as in FIGS. 8 and 9.

Figure 11:
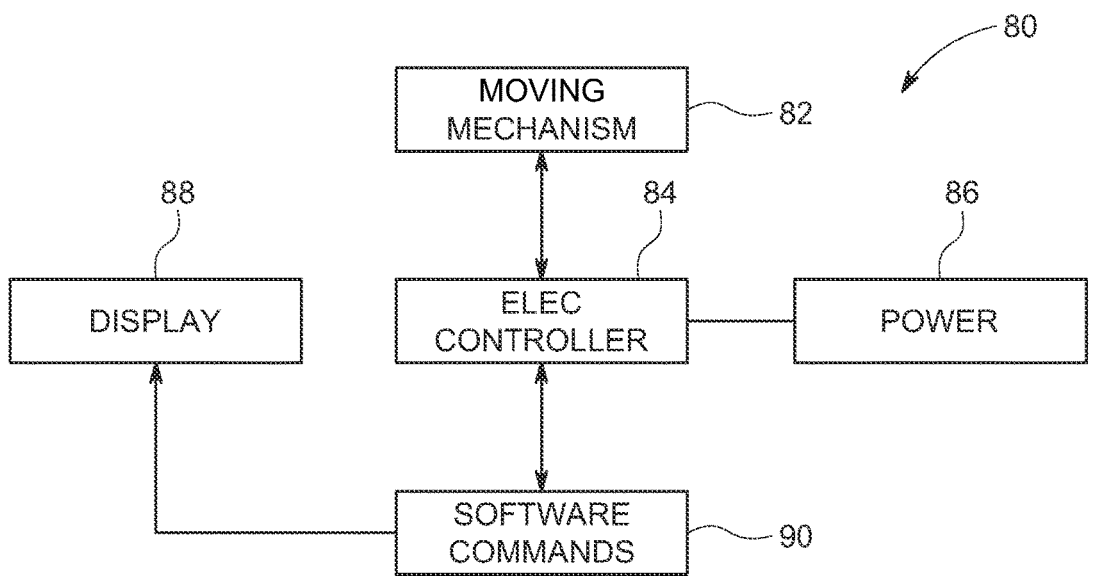
FIG. 11 is a block diagram of major components of an electrical control system in accordance with the present invention.

The block diagram of FIG. 11 illustrates the generic moving mechanism 82 (which represents any one and many modifications and variations of the locking mechanism shown in FIGS. 8, 9 and 10) receiving electrical signal controls from electrical controller 84 which is part of the overall control system 80 which is powered by a power module 86. The electrical controller 84 is in turn configured to receive inputs from software 90 that operates software APP 90 that issues the appropriate instructions including providing certain displays at the display 88 whether the USB-C port is or is not in the locked position, as illustrated in greater detail in FIG. 12.

Figure 12:
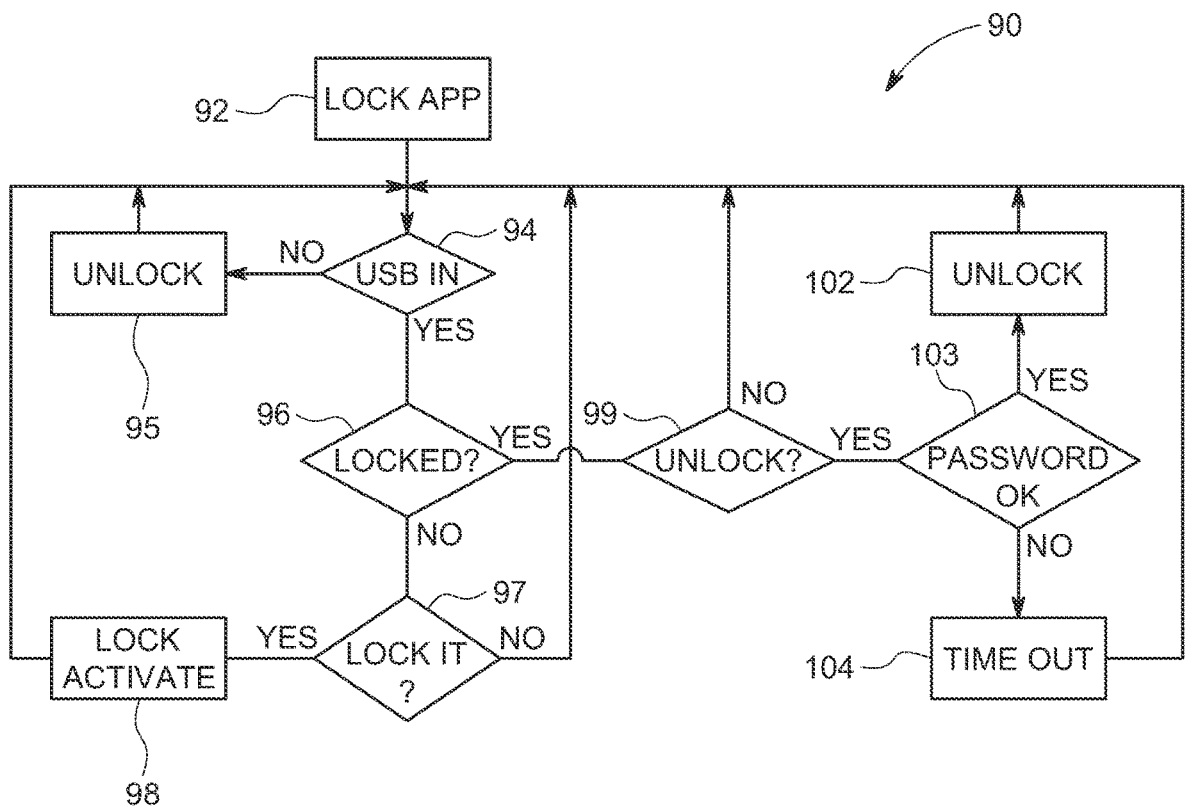
FIG. 12 is a block diagram of software modules associated with a lock APP for the present invention.

Referring to the software flowchart of FIG. 12, the overall control lock APP 90 has a lock APP overall control module 92 that normally performs a software algorithm including by first entering decision box 94 and inquiring whether the USB plug is installed. If not, then the lock mechanism 82 is issued an unlock command at the block 95. However, if the USB plug is installed, the software continues to decision block 96 where it is determined whether the mechanism is in the "locked" position. If yes, that may be shown on the display that is the screen of the computing device.

As an aside, the socket may be provided therein with a micro switch that provides a signal that informs the software of the "locked"/"unlocked" status thereof. Regardless, if the mechanism is not in a locked state, the software proceeds to decision block 97 and queries whether the software instruction from the user has been to activate the lock. If yes, the lock mechanism is activated at block 98 and the software loop continues. If there is no instruction to lock the USB-C cable plug, the software returns to loop around. It should be noted that the software may include a default state which provides that whenever the USB plug is installed, it automatically requires to be locked.

Returning to the decision block 96, if it is noted that the USB port is already in a locked position, the software proceeds to decision module 99 and queries whether the operator or the user has requested or issued a command to unlock it. If yes, the decision block 103 determines whether a password required for unlocking has been entered. If yes, then an unlock command is issued at module 102. If not, the software times out and continues without any action. The overall software 90 may include many other functionalities that are naturally associated therewith including an ability to be queried by a system manager or to automatically provide historic information of when the plug has been removed or inserted, or if any attempt was made to break open and separate the USB-C plug from its socket.

This patent application also incorporates by reference the entire contents of the present inventor's U.S. Pat. No. 10,398,045 which issued on Aug. 27, 2019, and which describes a security slot that is anchored inside the computing device, to a PCB (printed circuit board) of the computing device.

Figure 13:
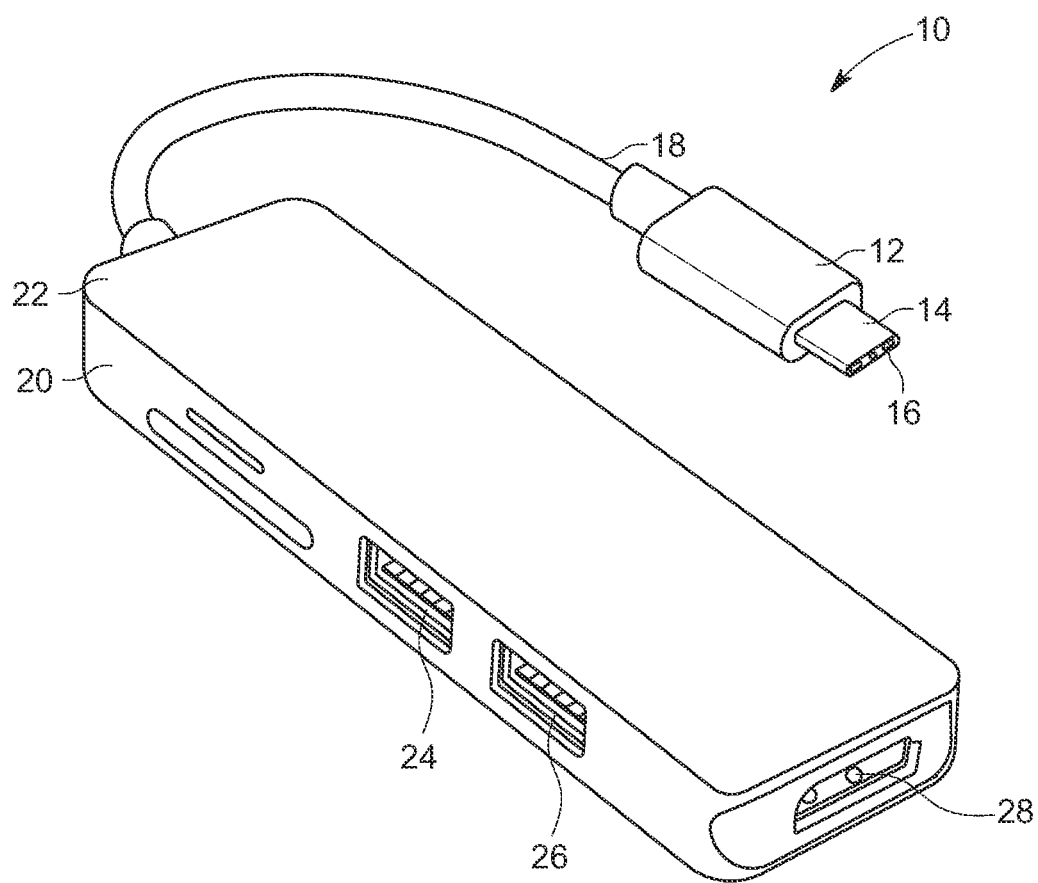
FIG. 13 perspectively illustrates a prior art USB plug that is connected to a hub which provides additional sockets for electrical communication with a computing device.

With reference to prior art FIG. 13, the USB-C plug 10 has a plug body 12 with an electrical plug 14 that houses internal electrical pins 16 that are connected to electrical wires that are located in the cable 18. The electrical cable 18 connects the electrical lines to a hub 20 that has a body 22 which defines therein first and second USB sockets 24, 26, an HDMI socket 28 as well as other sockets.

Figure 14:
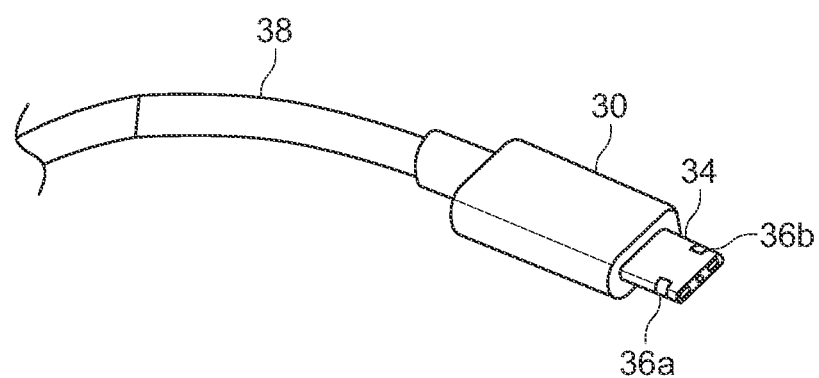
FIG. 14 shows the plug portion of FIG. 13 with cutouts formed therein which cutouts are engaged by locking elements inside the computing device, thereby enabling holding the plug secured inside and to the computing device.

With reference to FIG. 14, the plug end of FIG. 13 is now introduced as a modified USB port plug 30 with an electrical plug end 34 that has left and right side security cutouts 36a and 36b. The internal conductors extend via the cable 38 to a hub or in any other well-known manner.

Figure 15:
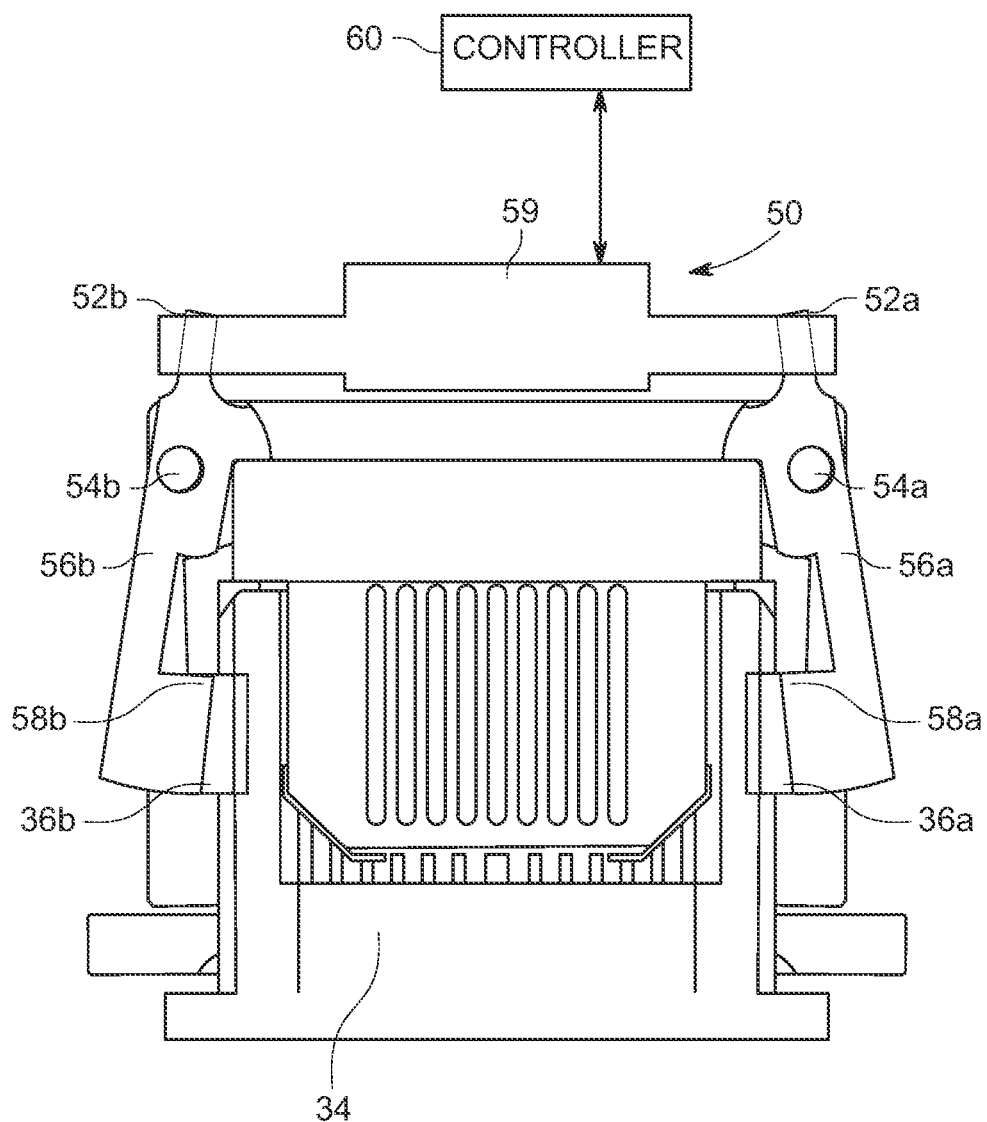
FIG. 15 shows the plug with the cutouts of FIG. 14 being inserted into the computing device.
Figure 16:
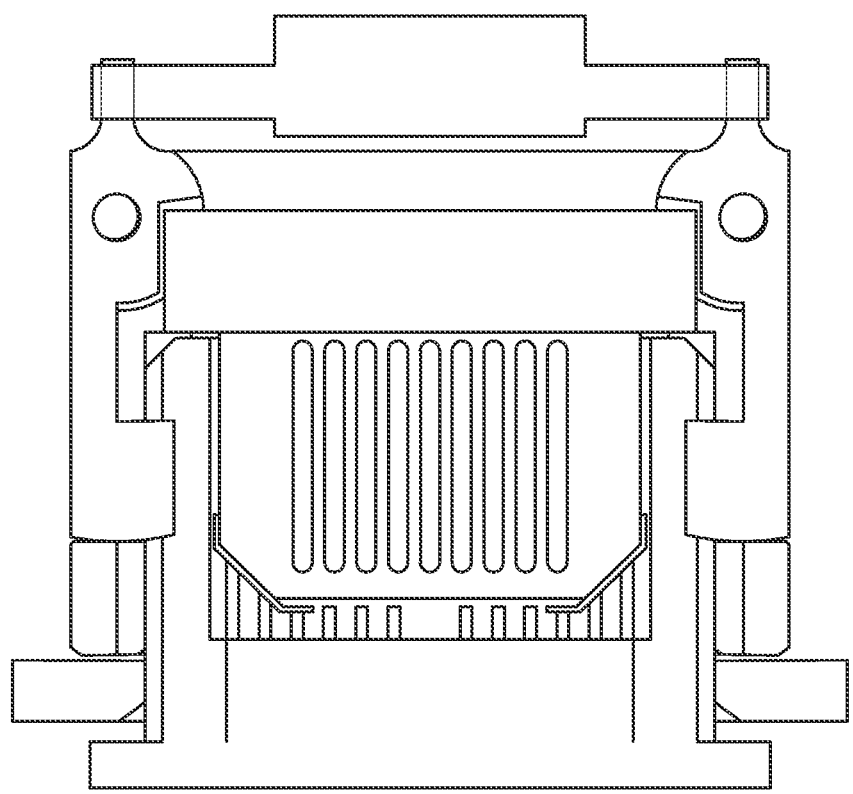
FIG. 16 shows the USB plug of FIG. 15 locked in the computing device.

Referring to FIG. 15, the modified plug 34 with the security cutouts 36a and 36b is insertable into a computing device internal socket 50 that is provided with left and right pivotable security tabs 56a and 56b, each of which at its distal end has a respective locking element 58a and 58b that fits inside the cutouts 36a and 36b when the locking elements pivot around their respective pivots 54a and 54b. When the security tabs 56a and 56b are electrically operated by a mechanism 59, their other ends 52a, 52b achieve the position as in FIG. 16, locking the USB plug 34 and making it difficult, if not impossible to withdraw from the computing device. The controller 60 indicated generically in FIG. 15 provides the electrical control signals that operate the internal lock. The internal control 60 can operate in a manner described above or in any other manner based on instructions that are inputted by a user through a keyboard or in other means to the computing device (not shown). See, for example, FIGS. 11 and 12 and the corresponding description.

Figure 17:
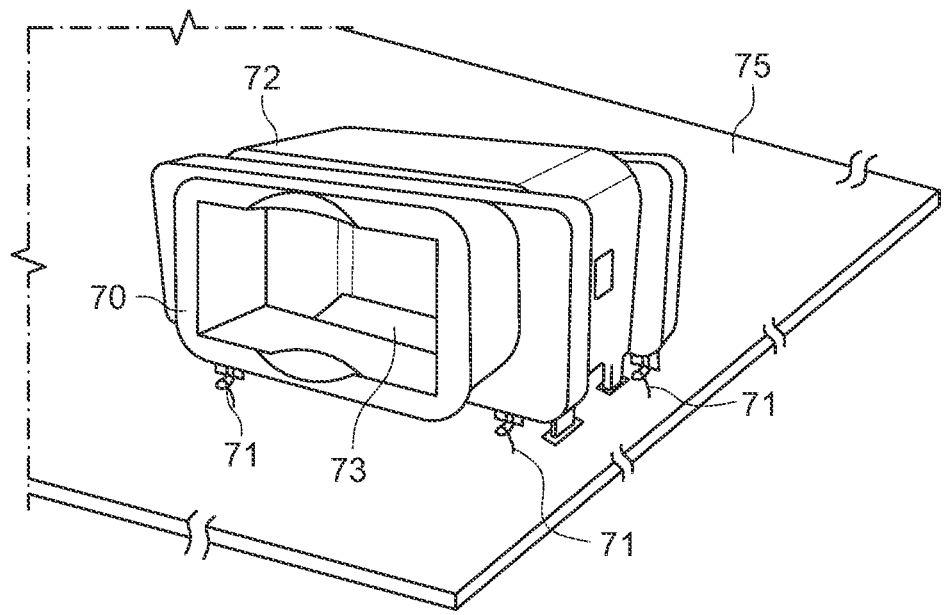
FIG. 17 shows a plug socket located inside a computing device and mounted to a printed circuit board (PCB) located in the computing device.

Referring to FIG. 17, the receiving socket 70 of the computing device which corresponds to the socket 50 in FIG. 15 which is generally indicated as the socket 70 in FIG. 17 is firmly secured inside the computer device to a PCB board 75 of the computing device through several pins including the pins 71 which are reentrantly bent and fit inside holes in the PCB 75, in which they are soldered. In addition, a U-shaped bracket 72 has its own pins that are fixed in holes inside the PCB board and soldered therein, holding down the security slot and making it exceedingly difficult to remove or to pull out the USB socket 70 from inside the computing device. Thereby, a USB plug or a head of a security cable can be inserted into the opening 73 of the socket, making it very difficult to remove it therefrom.

While the element 70 has been described above as being a socket for the USB plug, it can instead be formed as the slot which is described in the aforementioned U.S. Pat. No. 10,398,045. The slot may be a trapezoidal slot or a conventional slot known as the Kensington slot.

Figure 18:
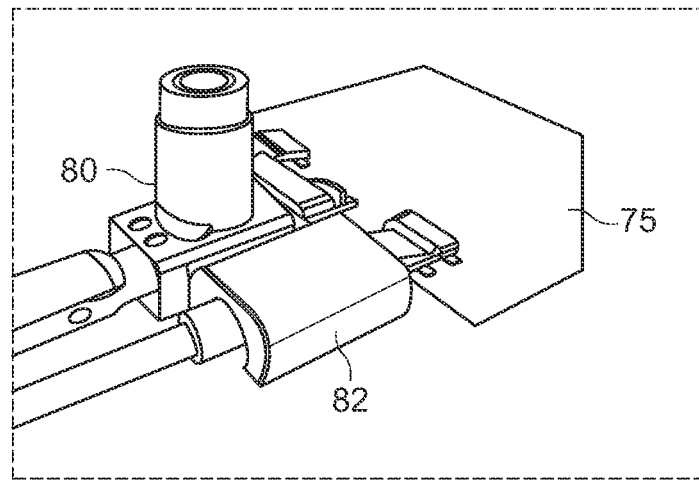
FIG. 18 shows a lock head of a security tethering cable and a USB plug locked to a PCB within the computing device.
Figure 19:
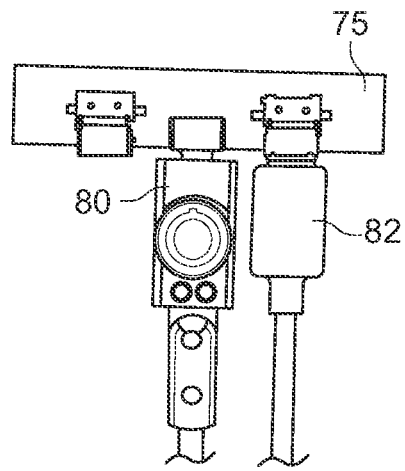
FIG. 19 shows a PCB of a computing device with several electrical sockets mounted to a PCB thereof.
Figure 20:
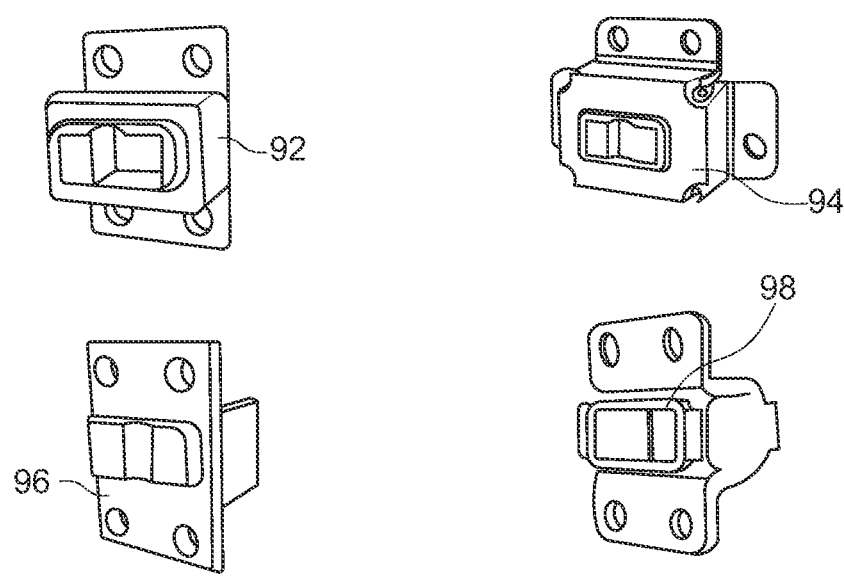
FIG. 20 shows four different methods of securing a USB sockets inside a computing device.

Therefore, and as shown in FIG. 18, when either a USB plug 82 or a conventional security cable 80 is inserted through openings in the outer wall of the computing device, the plug can be connected to a socket such as the socket 70 and the locking cable into a similar socket which receives the locking head of the security lock 80. This is also illustrated in FIG. 19. FIG. 20 shows a variety of plug sockets and the manner of their attachments to the PCB board, including as indicated at 92, 94, 96 and 98.

Figure 21:
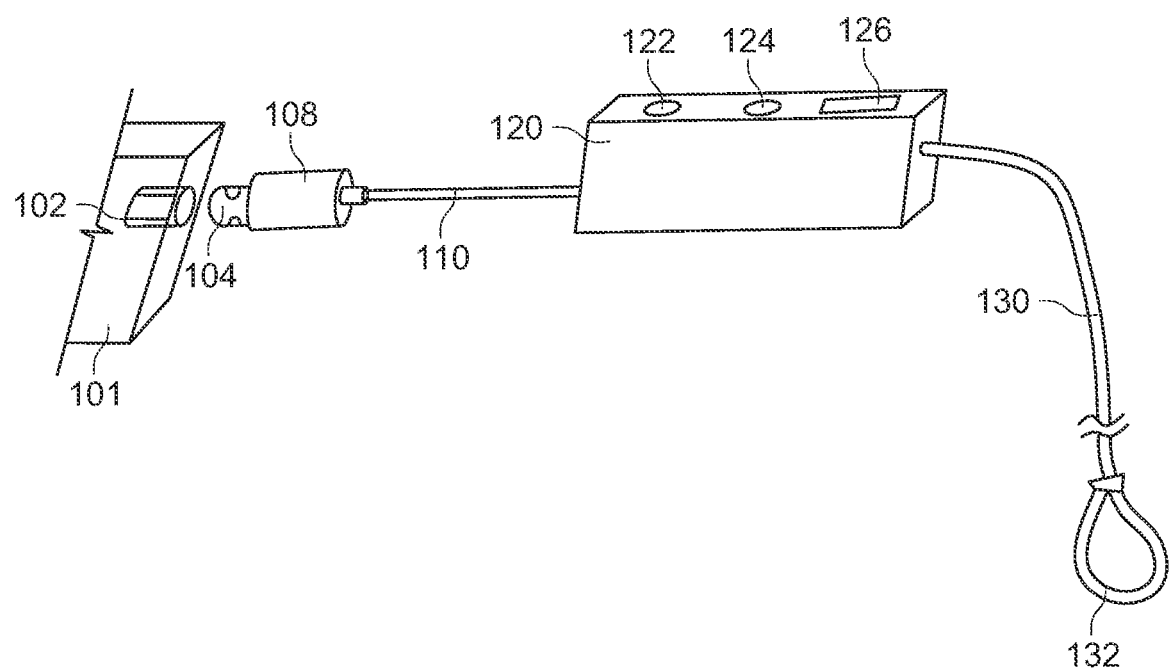
FIG. 21 shows a security system in accordance with the present invention.

Referring to FIG. 21, the computing device 101 which includes the security slot (and/or socket) 102 and which may be provided in plural forms including one that receives a USB plug and another that receives the locking head of a security cable enables the plug end 108 of a USB plug (which has the security cutouts referenced above) and the insertable plug 104 can be received in the security slot or in the socket 102 and its cable 110 is in this case reinforced by a steel jacket (or steel cable) that cannot be cut and which is connected to the hub 120 which is provided with the sockets 122, 124 and 126. The other side of the hub 120 continues with the steel cable 130 that ends with a conventional loop 132, which loop can be used to tether the computing device 101 to an immovable device, in a well-known manner.

Again in FIG. 21, the element 108 can also represent the locking head of a lock and the element 104 the locking end (the "head") of the lock which is received in a trapezoidal socket 102 as previously described, without providing any electrical function. Alternatively, the shown device represents both a lock and a USB or other type of electrical cable.

In accordance with a further embodiment of the invention, the hub 120 may be provided within with certain electrical functionality described as follows. That is, the modified hub 120' (FIG. 22) contains within an optional power supply 130, a remote device communication module 132, a controller 134, and a lock control 136 which enables it to communicate with a remote device 138, typically a smart phone or the like.

Figure 22:
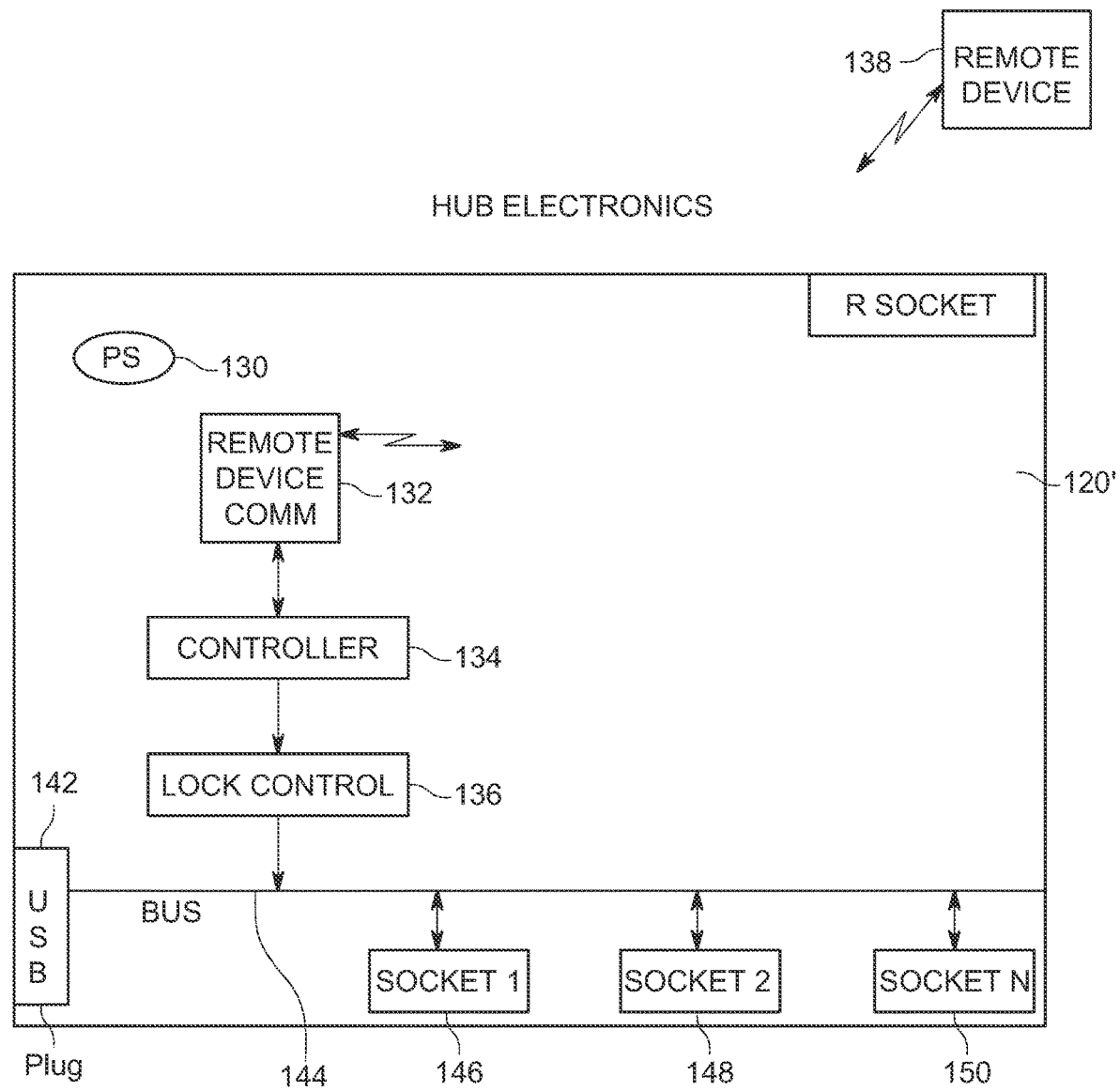
FIG. 22 shows a control system that can be provided outside of a computing device for controlling the internal locking of a USB locking mechanism inside the computing device.

Thus, as shown in FIG. 22, a USB port 142 which receives electrical signals over a bus 144 and communicates those signals to sockets 146, 148 and 150 can be utilized to communicate instructions to the computing device 101 (which is connected to the port 142) from the lock control 136, which instructions are provided by controller 134 which communicates with the remote device 138.

Thereby, assuming that a computing device 101 is tethered by the security cable of the present invention, it may receive instructions even when it is not turned on through the port 142 that operate its own controller 60 (FIG. 15) to release either the plug or the security head based on instructions received from the computing device.

In accordance with an additional feature of the present invention, the setup shown in FIG. 22 can be utilized to prevent anyone accessing information in the computing device through the sockets 146, 148 and 150 of the hub 120' by having the lock control 136 disable the signals from those sockets flowing over the respective bus lines 147, 149 and 151 from traveling over the main bus 144 to access contents in the computing device. This can be done by "shorting" one or more of the lines to "ground." In accordance with another embodiment, the entire hub 120 can be encased in a box that is mechanically locked and which prevents access to the sockets 146, 148 and 150 by operating a lock that is either a manual lock, for example, a combination lock, or an electrical lock that is operated by the remote device 138.

In accordance with a further feature of the invention, in lieu of power being provided from the power supply 130 inside the hub 120', the power can be communicated from the remote device socket 139 into one of the available sockets of the hub, for example, the socket 146 which may be a USB port.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronically lockable, electrical plug configured to communicate power and data signals to mobile electronic devices (MED), the electrical plug comprising:

a male electrical plug body insertable into a female electrical socket of the MED;

a plurality of electrical contacts defined in the male electrical plug for communicating the power and data signals to and from the MED, via corresponding electrical contacts associated with an MED electrical socket, said MED electrical socket being shaped and sized to physically receive and support therein said male electrical plug body;

at least one plug locking element formed in the male plug body, so formed as to be lockable to or with at least one corresponding, complementary socket locking element of the MED, so that upon insertion of the male plug body into the MED socket the electrical plug is locked with the MED;

an associated, electronically operable locking mechanism that is operable to mechanically disengage the plug locking element from the socket locking element to thereby enable the electrical plug to be released from the MED;

an electrical cable coupled to the male plug body for electrically conducting the signals; and said electrical plug being in combination with said MED, and said MED including and electrical system for operating said locking mechanism and including a software driven APP module that is stored and running within said MED and a corresponding APP module stored and running within a user mobile device to communicate software instructions to said locking mechanism.

2. The electrical plug of claim 1, including a metallic cable coupled to the male plug body, the cable having a distal free end that enables the distal free end to be tethered to an immovable object and thereby prevent theft of the MED.

3. The electrical plug of claim 1, wherein the male plug body is shaped and configured to function as a USB-C plug.

4. The electrical plug of claim 1, including a bub that contains at least two USB sockets, said hub being interposed in said electrical cable.

5. The electrical plug of claim 4, said hub including therein an interface that communicates with the user mobile device.

6. The electrical plug of claim 4, said hub including a power source for powering said locking mechanism.

7. An electronically lockable, electrical plug configured to communicate power and data signals to mobile electronic devices (MED), the electrical plug comprising:
  a male electrical plug body insertable into a female electrical socket of the MED;
  a plurality of electrical contacts defined in the male electrical plug for communicating the power and data signals to and from the MED, via corresponding electrical contacts associated with an MED electrical socket, said MED electrical socket being shaped and sized to physically receive and support therein said male electrical plug body;
  at least one plug locking element formed in the male plug body, so formed as to be lockable to or with at least one corresponding, complementary socket locking element of the MED, so that upon insertion of the male plug body into the MED socket the electrical plug is locked with the MED;
  an associated, electronically operable locking mechanism that is operable to mechanically disengage the plug locking element from the socket locking element to thereby enable the electrical plug to be released from the MED;
  an electrical cable coupled to the male plug body for electrically conducting the signals; and
  a metallic cable coupled to the male plug body, the cable having a distal free end that enables the distal free end to be tethered to an immovable object and thereby prevent theft of the MED.

8. The electrical plug of claim 7, wherein the metallic cable is integrated with the electrical cable.

9. The electrical plug of claim 7, wherein said male plug body has a general rectangular shape and wherein said at least one plug locking element comprises length-wise juxtaposed, first and second recesses that are formed in the male plug body and sized and shaped to receive said at least one socket locking element.

10. The electrical plug of claim 7, in combination with said MED, and said MED including and electrical system for sliding said at least one socket locking element out of said recesses.

11. The electrical plug of claim 7, including a wireless interface that is configured to allow a user to communicate with the electrical system to instruct operation of the mechanical disengaging of the electrical plug from the MED.

12. The electrical plug of claim 7, wherein said electrical system includes a solenoid for mechanically moving the at least one socket locking element.

13. The electrical plug of claim 7, including a wireless interface that is configured to allow a user to communicate with the electrical system to instruct operation of the mechanical disengaging of the electrical plug from the MED.

14. The electrical plug of claim 7, wherein said at least one socket locking element comprises a pair of hinge-mounted socket locking elements configured to move into and out of said recesses.

15. The electrical plug of claim 7, including a software driven APP module that is stored and running within said MED and a corresponding APP module stored and running within a user mobile device to communicate software instructions to said locking mechanism.

16. The electrical plug of claim 7, including an external controller that is coupled to the electrical plug and configured to produce control signals to the locking mechanism to release the electrical plug from the MED.

17. The electrical plug of claim 16, wherein the external controller includes and provides a plurality of USB sockets that are electrically configured to provide communications with the MED, via the MED electrical socket.

* * * * *